United States Patent [19]

Clelford et al.

[11] 4,382,283

[45] May 3, 1983

[54] HELICOPTER ATTITUDE AND AIRSPEED ACQUISITION AND RETENTION SYSTEM

[75] Inventors: Douglas H. Clelford; Richard D. Murphy, both of Trumbull, Conn.

[73] Assignee: United Technologies Corporation, Hartford, Conn.

[21] Appl. No.: 176,832

[22] Filed: Aug. 8, 1980

[51] Int. Cl.³ .................... G06F 15/50; B64C 11/34
[52] U.S. Cl. ............................. 364/434; 244/17.13; 244/177; 244/178; 364/424
[58] Field of Search .................. 364/424, 434, 565; 318/609; 244/17.13, 177, 178, 182

[56] References Cited

U.S. PATENT DOCUMENTS

| | | | |
|---|---|---|---|
| 4,003,532 | 1/1977 | Adams, Sr. et al. | 244/178 X |
| 4,129,275 | 12/1978 | Gerstine et al. | 364/434 X |
| 4,168,045 | 9/1979 | Wright et al. | 244/178 X |
| 4,206,891 | 6/1980 | Perez et al. | 244/17.13 |
| 4,213,584 | 7/1980 | Tefft et al. | 244/177 X |

Primary Examiner—Jerry Smith

Attorney, Agent, or Firm—M. P. Williams

[57] ABSTRACT

A helicopter pitch axis autopilot system, including airspeed hold at cruise speeds and pitch attitude hold below cruise speeds, includes integrated longitudinal acceleration drift corrected by heavily filtered Pitot static airspeed as a filtered airspeed reference, use of a beeper to nudge the airspeed reference above cruise speeds or the pitch attitude reference below cruise speeds, resynchronizing of airspeed reference, pitch attitude reference, pitch autopilot integrator and stick trim position reference, momentarily in response to airspeed transitions between cruise and sub-cruise speeds or in response to initiation of beeping, and continuously during trim release. Pilot override without disengagement of the autopilot and ultimate return to a previous speed or attitude is achieved by sensing pilot activity and causing the pitch autopilot integrator value to be held during pilot override, and limiting the value of airspeed error that drives the pitch autopilot integrator once the pilot activity has subsided.

7 Claims, 7 Drawing Figures

HELICOPTER ATTITUDE AND AIRSPEED ACQUISITION AND RETENTION SYSTEM

The Government has rights in this invention pursuant to Contract No. N00019-75-C-0267 awarded by the Department of the Navy.

TECHNICAL FIELD

This invention relates to helicopter control systems, and more particularly to improvements in electrical speed and attitude acquisition and retention control systems.

BACKGROUND ART

As is known, the speed of a helicopter is a function of main rotor collective pitch and longitudinal cyclic pitch. In helicopter autopilot systems, it is known to provide airspeed hold at cruise speeds (such as above about 60 knots) and to provide aircraft attitude hold at speeds below cruise speeds. In order to hold speed, a desired speed is achieved and then the hold system is synchronized to it, so that the desired speed is "remembered" and deviations in actual speed provide inputs to the helicopter control system so as to correct the speed until the error is zero. Similarly, desired attitude can be synchronized when attitude hold is employed. The system for responding to deviation from either the desired speed or the desired attitude generally includes both proportional and integral gains to provide fast, stable operation with zero steady state error.

Also known in the helicopter art is what is sometimes referred to as a "beeper", which derived its name from limited pulsing of hydraulic servo-mechanisms in response to the depression of a beeper valve, which causes a hydraulically-induced beep-like noise. In more modern, electrical control systems, the term "beeper" refers to spring returned switches, for both the forward and aft directions (in the case of longitudinal cyclic pitch controls), that permit the pilot to nudge an autopilot output for either an increase or decrease in pitch attitude. In most helicopter autopilot systems known to the art, the beeper system is effective only in the pitch attitude channel, and not in the airspeed hold channel. Thus, nudging of airspeed is accomplished by nudging pitch attitude in anticipation of an ultimate airspeed which will result from the attitude assumed by nudging with the beeper switch. But, for desired acceleration, the required pitch attitude is achieved only by ramping the autopilot system (usually integrated attitude error) way beyond the value of a desired airspeed reference. Thus, opposite beeping is always required not only to reduce acceleration to zero at a desired speed, but also to reduce the integrated error reference to near zero before removing airspeed synchronization.

The response of a helicopter to inputs to its control system results in inherent lags. For instance, there is a lag between the command to achieve a particular attitude and the stabilization of the aircraft at such attitude. In addition, once a pitch attitude is actually achieved by a helicopter, the speed may continue to increase (or decrease) until an equilibrium speed, for the given attitude, is achieved. Therefore, if the pilot is using a pitch attitude beeper to adjust his airspeed, he must anticipate the changes in airspeed which will result after the beeper switch is released and the new attitude is established. Therefore, prior art helicopter control systems require a heavy pilot workload to estimate desired speed changes achievable by use of attitude beeping, while followed by one or two iterations of corrections thereto until desired airspeed has been achieved. In some systems, the anticipation of final aircraft speed prior to reengagement of the airspeed hold system has been achieved by means of a delay in reengagement of airspeed hold, such as on the order of a half a minute or so. However, this improvement requires that the pilot at least wait during that time frame before providing any additional trimming which may be necessary; furthermore, during turbulent conditions, it is impossible to acquire a precise airspeed reference at the point of reingagement of the airspeed hold system.

Another problem with prior art systems is that when beeping of attitude is used for speed correction, resynchronizing of the memorized desired airspeed at the initiation of beeping causes a discontinuity in the input to the control system. The degree of disturbance which results is a function of the amount of airspeed error at the time the beeping is initiated.

In some systems, a beeper switch may be applicable to an airspeed hold system (rather than only to the attitude hold system) allowing the pilot to beep his airspeed reference while at cruise speeds. However, once beeping is initiated, the lag in the speed response of the aircraft to attitude changes renders it impossible for the pilot to know what the new airspeed reference point will be until after speed has been stabilized. Although judgments can be made, it requires a high pilot workload to anticipate the amount of beeping required to change a speed reference point, and several corrections once the speed does begin to stabilize at a new reference point. This disadvantage is even more significant when large changes in airspeed are commanded by means of the beeper.

Another characteristic of helicopter airspeed hold systems known to the prior art, which results from the lags inherent in the system, is that any airspeed hold system must operate at high gain in order to be able to fully correct for variations in airspeed so as to hold the speed relatively constant as desired. However, if the gain of the airspeed hold system is increased to the point where it will maintain relatively constant speed in calm air, the system then becomes too responsive to gusts and turbulence, resulting in an uncomfortable ride. Thus, a compromise must be reached between the capability of maintaining airspeed and undesirable, erratic response during gusts and turbulence, resulting in a somewhat uncomfortable ride, coupled with less than adequate airspeed retention.

Yet another problem with prior art systems is that the transfer between attitude hold and airspeed hold, as the airspeed transitions between cruise and subcruise speeds, causes the control system inputs to commensurately transfer from speed error to attitude error (or vice versa) resulting in discontinuity. Thus, if airspeed were decreasing while on airspeed hold, the transition from a speed above cruise to a sub-cruise speed will result in a disturbance in the aircraft attitude due to loss of the integrated airspeed error input, which could be significant.

Another problem with aircraft autopilot systems known to the prior art is that when the aircraft is on autopilot, operations of the pilot in performing a maneuver will normally require the pilot to reestablish any trim point which he desires for attitude or airspeed hold, and/or result in discontinuities in aircraft commands as a consequence of transitions between manual and automatic operation.

DISCLOSURE OF INVENTION

Objects of the invention include provision of attitude and airspeed hold systems which combine maximum utilization with smooth performance, which permit pilot override without discontinuities in command signals, which allow changes in the airspeed or attitude reference points with a minimum of pilot workload and without disturbances in the operation of the aircraft, which permit smooth transitions between cruise speeds and sub-cruise speeds, and which permit smooth transitions between automatic and manual operation.

A first aspect of the present invention is predicated on the discovery that rough aircraft performance as a consequence of high-gain airspeed hold systems is principally a function of variations in indicated airspeed as a consequence of wind gusts and turbulence affecting the instantaneous output of a Pitot static airspeed indicating system, rather than variations in aircraft position directly in response to the gusts, causing undesirable autopilot inputs which in turn cause disturbances in aircraft performance. Accordingly, a first aspect of the present invention is provision of a filtered airspeed signal which is generated as the integral of the summation of longitudinal acceleration with proportional and integral functions of the summation of Pitot static airspeed and the resulting filtered airspeed itself.

According to a second aspect of the invention, the longitudinal cyclic pitch, or pitch axis, autopilot system of a helicopter includes a capability of changing the desired attitude or speed reference, with commensurate resynchronization of all of the inputs to the longitudinal autopilot system and without discontinuities with respect to the stick position. This is accomplished by providing resynchronization of a stick reference input to a stick-positioning trim actuator with stick trim position along with resynchronizing of all of the longitudinal autopilot system inputs and integrated reference. In further accord with this aspect of the invention, the resynchronizing referred to is accomplished in response to transitions between sub-cruise speeds and cruise speeds, as a consequence of initiation of beeping (or nudging) of the trim point, and in response to trim release by the pilot.

According to a further aspect of the invention, beeping results in only momentary resynchronizing of the autopilot system to a new reference, which the beeper then nudges along to a desired attitude or speed.

According to yet another aspect of the present invention, pilot override of an autopilot system, without disengagement of the autopilot system and with the ability to regain the desired speed which is being held at the time that the pilot desires to override the system, is achieved by sensing pilot activity in excess of a given threshold magnitude, and, in response thereto, memorizing the then-current autopilot reference value, such as speed or pitch attitude; upon return of the control stick to a point near the trim position, the aircraft is allowed to respond to a rate-limited variation in pitch command until the previously-held attitude or speed is attained. Thus, for short term maneuvering such as coordinated turns and the like, at both cruise speeds and sub-cruise speeds, the pilot can effect the desired maneuver without the necessity of reestablishing his attitude or speed trim point for the autopilot. In further accord with this aspect of the invention, variations in the trim point at the time of reestablishment thereof are maintained at a small minimum by means of a limiter at the input to a pitch autopilot integrator.

Because beeping is effected with the autopilot unsynchronized (after a short, momentary resynchronization at the initiation of beeping), the integrated error achieved, when desired speed with zero acceleration is reached, will be proper without integrating out any of the attitude error. And, short closure of the beeper switch is all that is required to totally synchronize the longitudinal autopilot system whenever desired airspeed or attitude has been achieved.

The present invention provides for smooth aircraft performance, highly effective longitudinal autopilot control, lack of disturbance in aircraft performance as a consequence of pilot override, transitions between cruise and sub-cruise speeds, beeping of the trim point, and the like. The invention may be readily implemented with apparatus and techniques which are within the skill of the art, in the light of the teachings which follow herein, in either analog or digital form, and is well suited to implementation by means of a digital computer.

Other objects, features and advantages of the present invention will become more apparent in the light of the following detailed description of exemplary embodiments thereof, as illustrated in the accompanying drawings.

BEST MODE FOR CARRYING OUT THE INVENTION

Figure 1:
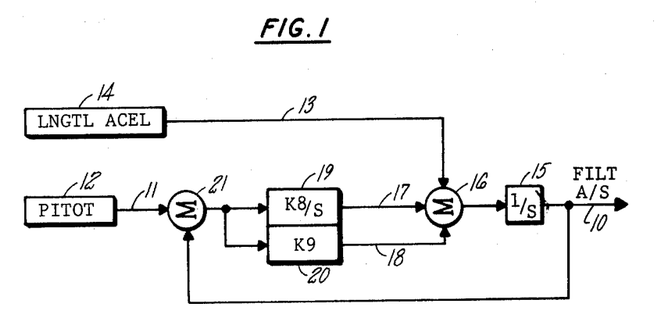
FIG. 1 is a simplified schematic diagram of apparatus for filtering airspeed in an analog embodiment of the invention.

Referring to FIG. 1, a first aspect of the present invention is provision of a filtered airspeed signal on a line 10 as a function of the integral of a combination of a conventional airspeed signal on a line 11, which may be derived from a conventional Pitot static airspeed measuring system 12, a longitudinal acceleration signal on a line 13, which may be derived from a conventional longitudinal accelerometer 14, and feedback of the filtered airspeed signal on the line 10, itself. Specifically, an integrator 15, that provides the filtered airspeed signal on the line 10, is responsive to a summing junction 16 which sums the longitudinal acceleration signal on the line 13 with an integral airspeed difference signal on a line 17 and a proportional airspeed difference signal on a line 18. The integral airspeed difference signal is provided by an integrator 19 having a gain (K8) which is chosen, together with the gain (K9) of a proportional amplifier 20, to provide, by combination of the signals on the lines 17 and 18, a second order system having a time constant of about 7 seconds and damping factor of about 0.7. The amplifiers 19, 20 are fed from a summing junction 21 that sums the feedback filtered airspeed signal on the line 10 with the Pitot static-derived airspeed signal in the line 11. The filtering provided by the amplifiers 19, 20 and the integrator 15 eliminate all the short-term variations, which can result from wind gusts and turbulence, in the output of the Pitot static airspeed sensing system 12, but permit long-term indications of actual airspeed as the average wind velocity changes over periods of time, and as the aircraft speed varies. On the other hand, changes in inertial helicopter speed in the short term are sensed by the longitudinal accelerometer, the acceleration of the aircraft being integrated to aircraft velocity by the integrator 15 for short-term indications of speed changes. The net result is that instantaneous airspeed is available from the longitudinal accelerometer, but its long-term drifts are irrelevant since the heavily filtered Pitot static airspeed, together with the feedback, corrects for these drifts. In a sense, therefore, the filtered airspeed apparatus illustrated in FIG. 1 is in fact an integration of longitudinal acceleration with long-term drift stability provided by heavily filtered Pitot static airspeed.

Figure 2:
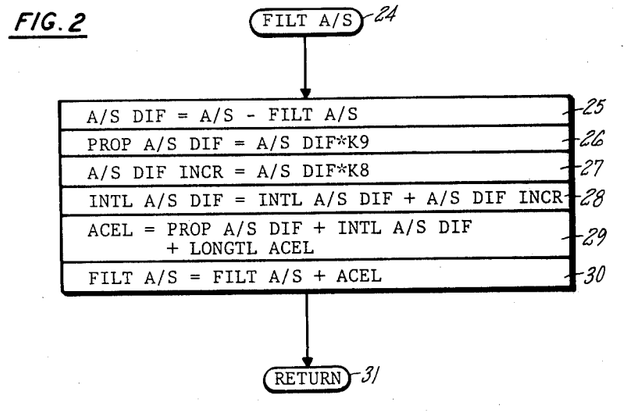
FIG. 2 is a simplified logic flow chart of a computer routine for providing filtered airspeed of the type illustrated in FIG. 1 in a digital computer embodiment of the invention.

The filtered airspeed according to the present invention may also be performed digitally. In FIG. 2 there is illustrated a filtered airspeed subroutine which is reached through an entry point 24, the first step of which is to provide airspeed difference as a function of Pitot static airspeed minus the filtered airspeed. This step is equivalent to the summing junction 21 of FIG. 1. Then, the proportional airspeed difference value, equivalent to the signal on the line 18, is generated by multiplying the airspeed difference factor by the gain K9 in a step 26. Next, in a step 27, an airspeed difference increment is generated by multiplying the airspeed difference times the gain K8, which is equivalent to the gain of the amplifier 19 in FIG. 1. This increment is added in a step 28 to an integral airspeed error value which is an accumulation function equivalent to the integral function of the amplifier 19 in FIG. 1. Then, in a step 29, the drift compensated acceleration, equivalent to the output of the summing junction 16 in FIG. 1, is generated as a summation of the proportional airspeed difference, the integral airspeed error, and the longitudinal acceleration (which is derived from an accelerometer in the same fashion as indicated generally in FIG. 1). The acceleration signal of step 29 is added to filtered airspeed in step 30, an accumulation function which is the digital equivalent of the integral function of the integrator 15 in FIG. 1. Then, the routine returns to other parts of the computer program through a transfer point 31.

The digital function indicated by the simplified flow chart of FIG. 2 may be implemented in any sort of a digital flight control system, such as that disclosed in the inventors' commonly-owned copending application Ser. No. 938,583, filed on Aug. 31, 1978, and entitled SELECTIVE DISABLEMENT IN FAIL-OPERATIONAL, FAIL-SAFE MULTI-COMPUTER CONTROL SYSTEM, now U.S. Pat. No. 4,270,168. In fact, the routine of FIG. 2 has been implemented in actual computers exemplary of the aforementioned copending application within the routine 906 for calculating pitch bias as illustrated in FIG. 9, utilizing longitudinal accelerometer and Pitot static airspeed signals loaded into the computer by direct memory access data moves as set forth in a table in said copending application.

On the other hand, the invention may be implemented in various other analog and digital forms, and may be implemented in either duplex or simplex computer systems, of a variety of architectural types, employing well-known programming techniques.

The embodiment of the invention of FIG. 1 bears some similarity to the use of integrated vertical accelerometer to provide a reference signal for an altitude hold autopilot function which is known to the prior art. However, in the prior art, the integrated vertical acceleration is used only as a substitute for barometric altitude rate in a lead portion of an altitude hold. Its use there is to avoid using the derivative of a noisy signal, the barometric altitude signal, which when differentiated becomes even more noisy. However, it is not used as an indication of the altitude which is to be held, whereas the present invention utilizes integrated longitudinal acceleration as a principal indication of aircraft airspeed, and employs the Pitot static airspeed simply to provide long-term, drift-free reference for the integrated acceleration, as well as providing the relatively constant wind reference to relate to airspeed.

Figure 3:
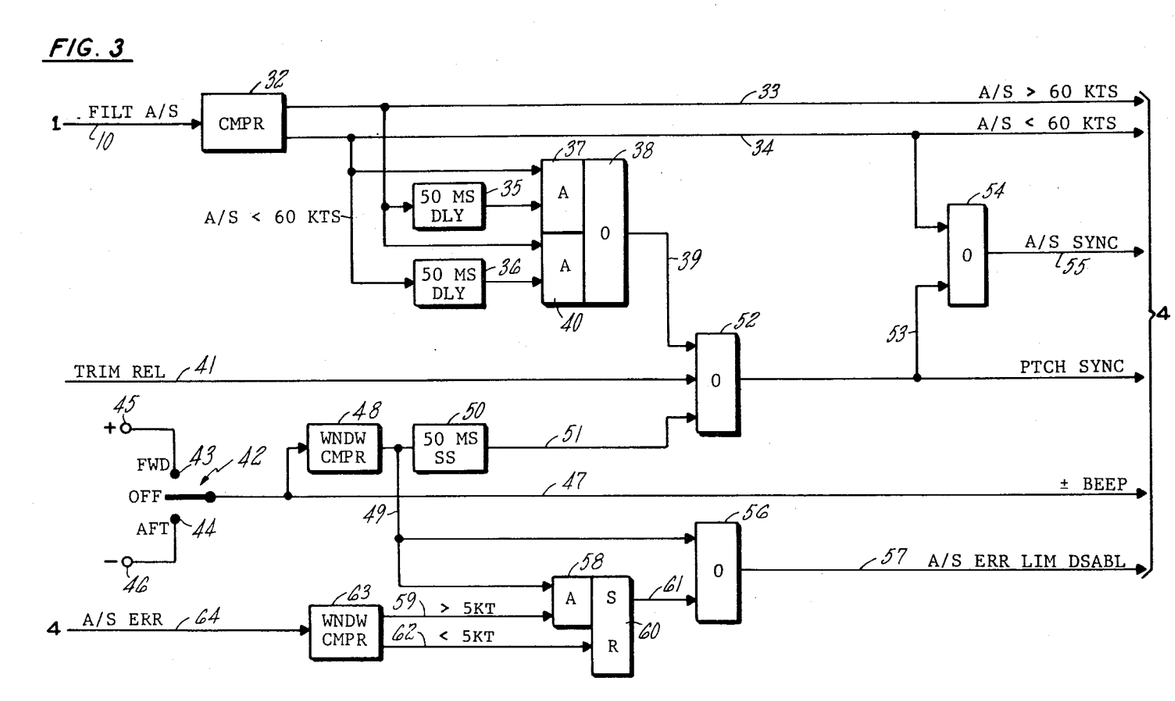
FIG. 3 is a simplified schematic diagram of circuitry for providing status signals useful in an analog embodiment of the present invention.
Figure 4:
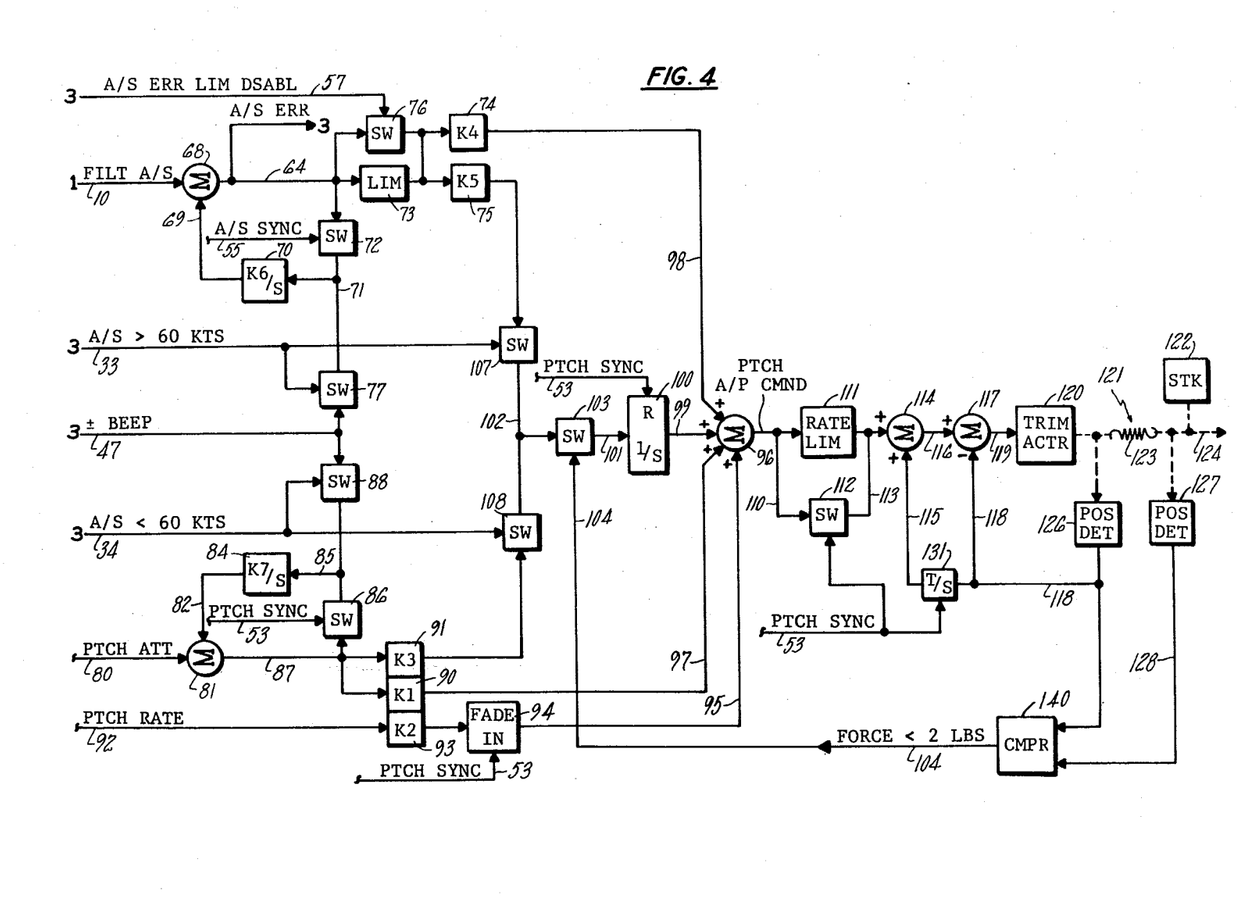
FIG. 4 is a simplified schematic diagram of an analog embodiment of a longitudinal autopilot system in accordance with the present invention.

Aspects of the invention are described in an analog form in FIG. 3, which provides control signals, and in FIG. 4 which consists of an analog embodiment of a longitudinal autopilot system according to the invention, operable under control of the signals generated in FIG. 3.

Referring now to FIG. 3, the filtered airspeed signal on the line 10, as generated in FIG. 1, is provided to a compare circuit 32 which will alternatively provide an airspeed greater than 60 knots signal on a line 33 or an airspeed less than 60 knots signal on a line 34, depending upon the speed indicated by the filtered airspeed signal. In order to determine when the aircraft transitions between cruise speeds (above 60 knots, in the embodiment herein) and sub-cruise speeds (below 60 knots) the signals on the lines 33, 34 are each compared with a delayed version of the other. Thus, the signal on the line 33 is fed to a delay circuit 35 and the signal on the line 34 is fed to delay circuit 36. In the event that the airspeed changes from above 60 knots to below 60 knots, an AND circuit 37 will immediately sense the signal on the line 34 indicating that the signal is below 60 knots, whereas the output of the delay circuit 35 will continue to be present for 50 milliseconds after the signal disappears from the line 33. This will provide a 50 millisecond gate to the AND circuit 37 so that an OR circuit 38 will provide a 50 millisecond signal on a line 39 indicative of the fact that a transition between cruise and sub-cruise speeds has occurred. Similarly, if the speed transitions from sub-cruise speeds to cruise speeds, the signal on the line 33 will enable an AND circuit 40 which will continue to be gated by a delay circuit 36 for 50 milliseconds after the signal disappears from the line 34. This similarly provides a 50 millisecond pulse on the line 39 indicative of an airspeed transition. As is known, it is common to provide a trim release button or switch on the cyclic stick of a helicopter. Depression of that switch will provide a trim release signal on a line 41. It is also known to provide "beeper" capability, which typically consists of a spring returned switch or valve for each of the forward and aft directions of the cyclic stick, momentary depression of which will cause nudging of the trim point of the longitudinal cyclic pitch axis in the indicated direction. As depicted herein, a beeper switch 42 has a forward contact 43 and an aft contact 44, each of which is connected to a voltage source 45, 46 of a corresponding polarity. Thus, if the pilot wishes to increase the nose down attitude of the helicopter or increase the speed from a current trim point, he may push the switch 42 so as to engage the contact 43 and thereby provide a positive signal on ±beep signal line 47; or, pushing the switch in the aft direction will cause a minus signal to appear on the ±beep signal line 47. The discrete fact that beeping is being engaged is determined by a window comparator 48 which simply determines that the signal on the line 47 is either above some small positive threshold or more negative than some small negative threshold to provide a beep signal on a line 49. A single-shot (monostable multivibrator) 50 provides a 50 millisecond pulse on a line 51 during beeping.

In FIG. 3, an OR circuit 52 responds to any of the signals on the lines 39, 41 or 51 to provide pitch synch signal on a line 53. The presence of the pitch synch signal on the line 53 will cause an OR circuit 54 to generate an airspeed synch signal on a line 55. The OR circuit 54 will also generate the airspeed synch signal provided that the aircraft is operating at sub-cruise speeds, as indicated by the airspeed less than 60 knots signal on the line 34; this prevents any airspeed error during attitude hold, as described hereinafter.

When the beep signal is present on the line 49, it will cause an OR circuit 56 to generate an airspeed limit disable signal on a line 57. It will also enable an AND circuit 58 so that, if a signal indicating that airspeed error exceeds 5 knots is present on a line 59, the AND circuit 58 can set a bistable device 60 to provide a signal on a line 61 that will also cause the OR circuit 56 to continue to present the airspeed error limit disable signal on the line 57, even after the beep signal disappears from the line 49. Once the bistable 60 is put into the set state, it will remain there until the airspeed error drops below 5 knots as indicated by a signal on a line 62. The signals on the lines 59 and 62 are alternatively provided by a window comparator 63 in response to an airspeed error signal provided on a line 64 by circuitry described with respect to FIG. 4 hereinafter.

The circuitry illustrated in FIG. 3 provide status signals that control the autopilot described hereinafter with respect to FIG. 4. A principal signal is the pitch synch signal on the line 53 (together with the airspeed synch signal on the line 55). Note that the pitch synch signal on the line 53 is generated in response either to transitions in airspeed between cruise and sub-cruise levels (signal on line 39), to trim release (signal on line 41) or initiation of a beep (signal on the line 51). And, whenever sub-cruise speeds are involved, the airspeed synch signal on the line 55 is constantly generated, for use in FIG. 4. But, the pitch synch signal is only momentary in response to speed transitions or initiation of beeping, but is present throughout trim release.

Referring now to FIG. 4, the longitudinal (or pitch) axis of the autopilot system includes an airspeed portion (in the upper left of FIG. 4) an attitude portion (in the lower left of FIG. 4) and common portions in the center and to the right of FIG. 4. In the airspeed portion, the filtered airspeed signal on the line 10 is applied to a summing junction 68 along with an integrated feedback signal on the line 69 from an integrating amplifier 70 having a gain K6. The integrating amplifier 70 provides the necessary integral feedback to cause synchronizing of the pilot-selected reference airspeed to the then-current filtered airspeed, in a well known fashion. Specifically, the input to the integrating amplifier 70 on a line 71 will be provided through a switch 72 as a function of an airspeed error signal on a line 64 generated by the summing junction 68, whenever the airspeed synch signal is present on the line 55. Since this signal will last at least 50 milliseconds, the output of the summing junction is fed to the integrating amplifier 70 for a sufficient time that the output of the amplifier will be equal to its input, so that the airspeed error signal on line 64 will eventually go to zero and the output of the amplifier 70 will stabilize. This is referred to as synchronizing. Then, when the airspeed synch signal is no longer present on the line 55, the switch 72 will be open, and (except during beeping as is described hereinafter) there will be no signal on the line 71 and therefore the output of the integrator on line 69 will thereafter remain constant, whereby the integrator 70 acts as a memory unit memorizing the desired filtered airspeed at the time of synchronizing.

The airspeed error signal on the line 64 is fed through an airspeed error limit circuit 73 and then to a pair of amplifiers 74, 75 having gains K4 and K5 respectively. The limiter 73 causes the airspeed error signal which is utilized to be no greater than some value, such as 5 knots. However, the function of the limiter 73 can be eliminated from the circuitry of FIG. 4 whenever a switch 76 is closed by means of the airspeed error limit disable signal on the line 57 (from the circuitry described hereinbefore with respect to FIG. 3). Thus, during beeping, where it is desirable to allow the circuits to respond to the maximum airspeed error, the limiter 73 can be bypassed. If the pilot desires to nudge the speed trim point, when operating at cruise speeds with airspeed hold engaged, he may depress the beeper switch, which will provide a signal of a known magnitude on the line 47, the polarity of which is dependent on whether he wishes to increase or decrease his speed. If operating at cruise speed, the airspeed greater than 60 knots signal will be present on the line 33 which will operate a switch 77 to cause the ±beep signal to be applied on the line 71 at the input to the integrating amplifier 70. The integrating amplifier 70 will therefore integrate the fixed ±beep signal, of desired polarity, so long as the beep switch is depressed in that direction. This will cause the output of the integrating amplifier 70 on the line 69 to provide a changing signal at the summing junction 68 so as to create an airspeed error signal component on the line 64 indicative of the nudging of the trim point being effected by the beeper.

At the bottom of FIG. 4, the pitch attitude circuitry is responsive to a pitch attitude signal on a line 80 derived from the pitch axis output of the vertical gyro of the aircraft (or equivalent). In a fashion fully analogous to the airspeed circuitry described in FIG. 4 thus far, the pitch attitude circuitry includes a summing junction 81 fed by a signal line 82 from the output of an integrating amplifier 84, having a gain of K7. The amplifier 84 in turn responds to signals on a line 85. Dependent on closure of a switch 86, in response to presence of the pitch synch signal on the line 53, the line 85 is responsive to the output of the summing junction 81 on the line 87. Or the integrator 84 may respond to the beep signal on the line 47 when a switch 88 is closed by the airspeed less than 60 knots signal on the line 34. The pitch attitude synch signal (equivalent to the airspeed error signal on the line 64) is applied by the line 87 to a pair of amplifiers 90, 91 having gains K1 and K3 respectively and corresponding to the amplifiers 74, 75, described with respect to airspeed hereinbefore.

In addition, the bottom of FIG. 4 includes a pitch rate stability signal provided by a pitch rate signal on a line 92 in response to a pitch rate gyro, which is fed through an amplifier 93 having a gain of K2 and to a fade-in circuit 94. The fade-in circuit 94 may comprise the combination of a variable gain amplifier and a ramp circuit generating a voltage applied to the gain control input of the amplifier, to provide a signal that is zero whenever the pitch synch signal is present on the line 53, and ramps upwardly to a signal having a multiplication value of "one" within some fade-in time duration, such as 1 second. The gain of the amplifier within the fade-in circuit 94 will be zero during pitch synch and increase rapidly to "one" thereafter, to provide a gradually applied pitch rate command signal on the line 95 to a summing junction 96.

The summing junction 96 is also responsive to a pitch attitude command signal on a line 97 and an airspeed proportional signal on a line 98. The summing junction 96 is further responsive to a pitch autopilot integrator signal on a line 99, provided by an autopilot integrator circuit 100, which integrates the value of an integrator input signal on a line 101. The integrator input signal on the line 101 will be whatever is present on the line 102 whenever a switch 103 is closed by virtue of a pitch trim force less than two pound signal, on a line 104. But if the signal on the line 104 is absent, indicating a force greater than two pounds on the stick, the integrator input signal on the line 101 will be zero, causing the pitch autopilot integrator 100 to hold its present value, for purposes described hereinafter. Whenever the system is synchronized, the pitch synch signal on the line 53 will reset the value stored in the integrator 100 to zero.

The signal on the line 102 will be provided from the output of the amplifier 75 whenever the airspeed greater than 60 knots signal is present on the line 33 to close a switch 107. The signal on the line 102 will be provided by the amplifier 91 whenever the airspeed less than 60 knots signal is present on the line 34 to close a switch 108. Thus, the indication of cruise speed on the lines 33 and 34 will select either speed or attitude for beeping (when appropriate) and will similarly select either speed or attitude for application to the pitch autopilot integrator 100.

The circuitry described thus far provides, to the summing junction 96, signals proportional to airspeed error, pitch attitude synch and pitch rate, as well as the output of the pitch autopilot integrator, which in turn is either zero following pitch synch, a fixed value if the switch 103 is not operated, or the integral of a function of airspeed above 60 knots or pitch attitude below 60 knots. The output of the summing junction 96 comprises a pitch autopilot command signal on a line 110 which is passed through a rate limit circuit 111 except during synchronization, when the pitch synch signal on the line 53 can operate a switch 112 to bypass the rate limiting circuit 111. The rate limiting circuit 111 can comprise any known slew rate filter, or the serial combination of a differentiator, an amplitude limiter, and an integrator, as is known in the art. The pitch autopilot command signal, whether rate limited or not, is applied on a line 113 to a summing junction 114 for summation with a stick synch signal on a line 115. The stick synch signal on the line 115 is derived by synchronizing to a desirable stick trim position, as described hereinafter.

The output of the summing junction 114 comprises a stick reference signal on a line 116 which is applied to a summing junction 117 that subtracts a stick trim position signal on a line 118 therefrom. This provides a stick command error signal on a line 119 that is fed (through a suitable amplifier, not shown) to a trim actuator 120. In the embodiment described herein, the trim actuator 120 is part of a force augmentation system that applies desired force to the stick relative to the stick trim position, in a manner known in the art; however, the actual desired force inputs to the trim actuator are eliminated herefrom since they form no part of the present invention. Furthermore, the invention, including the remaining circuitry described thus far, may be employed in an aircraft control system which does not employ hydraulically-induced force augmentation to the stick, but utilizes, instead, an outer loop autopilot actuator not capable of the force function. The trim actuator 120 provides force to a mechanical linkage system 121 which is connected to the pilot's longitudinal cyclic stick 122 through an override spring 123, and connects by linkage 124 to the main rotor blade pitch control mechanism of a type known in the art. The linkage 121 is also connected to position detectors 126, 127 which may simply comprise potentiometers or LVDT's connected to the output of the trim actuator and the linkage 124, respectively. The stick trim position signal on the line 118 provided by the position detector 126 is indicative of the stick trim position; on the other hand, the signal on the line 128 at the output of the position detector 127, being connected by the linkage 124 directly to the pilot's stick 122, is indicative of the actual position of the stick. Whenever the pilot is not overriding the system, these positions will be the same. The stick position signal on the line 118 is not only provided for closed loop servo operation to the summing junction 117, but is also provided to a track store unit 131. As is known, the output of the track store unit will track any signal applied to its input whenever the pitch synch signal is present at a track command input thereto, but the output will remain constant (and thus store the last input) when the pitch synch signal is not present. Therefore, during pitch synch, the stick synch signal on the line 115 is updated to the stick trim position signal on the line 118, and when the pitch synch signal on the line 53 disappears, the track store 131 will retain that stick synch signal on the line 115.

Thus, during the general synchronization which results when the pitch synch signal is present, a variety of functions are performed. Consider the case when the airspeed is less than 60 knots so that the attitude hold function (rather than airspeed hold) is being performed by the autopilot circuit of FIG. 4. Should the pilot desire to beep the attitude trim point, or should he press the trim release switch, or should the airspeed transition and become higher than 60 knots, the pitch synch signal will be present on the line 53. This will cause a variety of direct results and a further variety of consequential results which together resynchronize the entire system. The pitch attitude synch signal on the line 87 will equal zero, because the pitch attitude reference signal is updated through the switch 86 and the integrating amplifier 84 to be equal to the pitch attitude signal. Thus, the output of the amplifier 91 will be zero, and the signal on the lines 102 and 101 will be zero, so there will be no input to the pitch autopilot integrator 100. The integrator is also reset to zero by the pitch synch signal on the line 53, so that there will be no signal on the line 99 to the summing junction 96. Similarly, with the pitch attitude synch signal on the line 87 equal to zero, the pitch attitude command signal on the line 97 will be zero as well. Because the pitch synch signal on the line 53 also forces the fade-in constant in the fade-in circuit 94 to zero, the pitch rate command signal on the line 95 will also be zero. If the airspeed is less than 60 knots, the airspeed synch signal on the line 55 (generated in FIG. 3 by the OR circuit 54) will be constantly present, so the airspeed reference signal on line 69 will be resynchronized to filtered airspeed at all times, and therefore the airspeed error on line 64 will be zero. And the amplifier 74 will provide a zero airspeed proportional signal on the line 98. This is necessary since holding pitch attitude at sub-cruise speeds should not be subject to any airspeed error input to the summing junction 96.

The pitch synch signal on the line 53 bypasses the rate limiting circuitry 111 so that the signal on the line 113 will immediately follow the pitch autopilot command signal on the line 110, which is zero. Because of the action of the pitch synch signal on the line 53 and the track store 131 described hereinbefore, the input to the summing junction 114 on the line 113 can go to zero without any change in the stick command error signal out of the summing junction 117 since the stick trim position signal on line 118 is immediately passed through the track store 131 to the line 115, to make up any difference and hold the stick reference signal on the line 116 equal to the stick trim position on the line 118 during the presence of the pitch synch signal on the line 53.

It is an aspect of the invention that the stick command error signal on the line 119 will remain constant even though the remainder of the system is resynchronized and provides zero pitch autopilot command on the line 110 because the stick reference signal on the line 116 is made equal to the stick trim position signal on the line 118, which remains constant because the trim actuator 120 will not respond instantaneously during the 50 milliseconds of a pitch synch signal. Thus, changes of operational mode can occur and beeping can be initiated without any transients being applied to the trim actuator 120.

The action of the pitch synch signal has just been described. If the pitch synch signal on the line 53 is provided in response to depression of the trim release signal, so that the trim release signal on the line 41 (FIG. 3) operates the OR circuit 50, the pitch synch signal on the line 53 will be present, causing constant synchronization, so long as the stick trim release is being pressed. Normally, the purpose of the pilot, when utilizing the trim release is to establish a new trim point following motion of his stick off of a trim position. Such would be the case if he desired to alter his pitch attitude at sub-cruise speeds or to provide large changes in the airspeed hold trim point at cruise speeds. Therefore, since the pitch synch signal is present throughout the period of time that the trim release signal is present, the synchronizing at the end of the trim release signal would be at the present pitch attitude and filtered airspeed, and holding the stick relatively constant after disengaging the trim release signal would cause the trim actuator to drive the trim point to the same position as the stick, at which point the pilot could let go of the stick and the system would be synchronized to the airspeed and pitch attitude achieved while holding the trim release depressed. Momentary beeping may then be used to correct for any speed error due to system and airspeed lags.

Consider now the case where the longitudinal autopilot is engaged and the aircraft is below cruise speed, and the pilot thereafter decides to advance the aircraft above cruise speed, such as advancing from 40 knots to 100 knots by both pushing the cyclic stick 122 forward and raising the collective pitch stick in the known manner. This will cause a transition from airspeed less than 60 knots to airspeed greater than 60 knots. Thus, the OR circuit 38 (FIG. 3) will be responsible for causing a 50 millisecond pitch synch signal on the line 53. The functions of pitch synch described hereinbefore will all be performed in the same fashion. Since both pitch attitude and filtered airspeed are resynchronized by their respective integrating amplifiers 69, 84, the airspeed error on the line 64 and pitch attitude synch on the line 87 will both be zero so that the outputs of all of the amplifiers 74, 75, 90 and 91 will be zero. And, as before, the fade-in circuit 94 will have a gain of zero and the pitch autopilot integrator 100 will be reset, so that all of the inputs to the summing junction 96 are zero as before. This provides a zero input to the summing junction 114 on the line 113, as before. Thus, the only difference between the pitch synch function at cruise speeds and that at sub-cruise speeds is that the airspeed error is synchronized by pitch synch at cruise speeds, but is synchronized all the time at sub-cruise speeds.

Consider the beeping operation. In FIG. 3 the ±beep signal on the line 47 causes the discrete beep signal on the line 49 to generate the pitch synch signal on the line 53 for the 50 millisecond period of the single shot 50. This is identical to the operation of the 50 millisecond pulse on the line 39 insofar as the pitch synch signal is concerned. If the airspeed is above cruise, there will also be a 50 millisecond airspeed synch signal on the line 55, but if the airspeed is at a sub-cruise magnitude, this signal is constant. Thus, momemtary synchronization of the circuit of FIG. 4 will occur as described with respect to airspeed transitions hereinbefore. Thereafter, however, the constant beep signal on the line 49 will generate a constant airspeed error limit disable signal on the line 57. In FIG. 4, this causes the switch 76 to bypass the limiter 73 so that any airspeed error (after 50 millisecond synch) can be fed through both of the amplifiers 74, 75 and the system can respond thereto. This means that whatever airspeed errors are generated by driving the integrating amplifier 70 as a result of beeping, the system will respond to them so that when beeping is complete, there will not be a large airspeed error remaining that will continue to adjust the attitude of the aircraft following beeping. In fact, the only lag in such case is the lag in the aircraft achieving an airspeed commensurate to a particular pitch attitude which is commanded by the beeping up to the point where beeping is ended.

The ±beep signal on the line 47 is applied through an appropriate one of the switches 77, 88 to a related integrating amplifier 70, 84 in dependence upon whether the airspeed greater than 60 knots signal is present on the line 33 or the airspeed less than 60 knots signal is present on the line 34, respectively. At the end of the 50 millisecond pitch synch signal on the line 53 the switch 86 will no longer be closed and at the end of the 50 millisecond airspeed synch signal on the line 55 the switch 72 will no longer be closed. Thereafter the ±beep signal on the line 47 passing through the respective swtich 77, 88 (depending on airspeed) will cause the corresponding amplifier to begin to integrate the fixed valued voltage on the ±beep signal, to either increase or decrease the output of the related integrating amplifier 70, 84, depending on which contact 43, 44 (FIG. 3) has been engaged by the pilot. If desired, the beep signal on the line 47 could be delayed by about fifty milliseconds to avoid having the input line 71 to the integrating amplifier 70 connected both to the airspeed error signal on the line 64, by the switch 72, and to the beep signal on the line 47, by the switch 77, at the same time (and commensurately with respect to the switches 86, 88). So long as the beeper is depressed, the integration continues and the related integrating amplifier 70, 84 will present a changing reference signal to its corresponding summing junction 68, 81 depending upon whether airspeed is above cruise or not. And, so long as the beeper switch is depressed, the airspeed error limiter 73 will be bypassed by the switch 76 as a consequence of the airspeed error limit disable signal on the line 57. Thus, any airspeed error which is created by constant application of the beeper switch will be passed through the switch 76 and the amplifiers 74 and 75 will have a commensurate effect on the pitch autopilot command signal output of the summing junction 96. The beep rate is thus controlling rate of autopilot response. When the beep signal is released, however, if the airspeed of the aircraft, as indicated by the filtered airspeed signal on the line 10, has not caught up to within at least 5 knots of the desired airspeed commanded by the integrating amplifier 70 as a result of beeping, as manifested in the airspeed error reference signal on the line 69, the airspeed error limit disable signal on the line 57 will continue to be present as a consequence of operation of the bistable circuit 61 (FIG. 3). But if the airspeed error had never exceeded 5 knots, the bistable would not have been set in the first place. And if during beeping or thereafter the aircraft airspeed does achieve within 5 knots of the commanded airspeed, then the window comparator 63 (FIG. 3) will provide the less than 5 knots signal on the line 62 to reset the bistable 60 so that the OR circuit 56 will no longer present the airspeed error limit disable signal on the line 57. Thus, the limiter again will be in place so that any subsequent large airspeed errors will be limited to 5 knots, plus providing smooth transitions from one airspeed to another.

Notice that the limiter 73 will be operative during pitch synchs caused by airspeed transitions or whenever the trim release is depressed since these will not cause the airspeed error limit disable signal to appear. Therefore, if the pilot provides override of the autopilot system without disengaging it so that the airspeed is in fact changed markedly from the airspeed reference, the autopilot system will nonetheless only respond to airspeed errors of 5 knots. This provides smooth transitions between speeds. Similarly, should the pilot achieve a new desired speed and then depress trim release, the autopilot would have been catching up at the rate of 5 knots until trim release is depressed, at which time the airspeed error would go to zero in any event. But if trim release were depressed throughout the time that the pilot were overriding the system, the airspeed error would be zero and the limiter would be unnecessary.

Consider now the situation where the pilot desires to override but not disengage the autopilot system, such as to perform a coordinated turn and then return to reference speed. If he provides a sufficient input to the stick to exceed a threshold magnitude of difference from the trim actuator position, the output signals of the two position detectors 126, 127 will cause the signals on the lines 118, 128 to diverge by some threshold amount (taken to be that equal to about 2 lbs. of force in the spring 123), causing a comparator 140 to stop providing the force less than 2 lbs. signal on the line 104. This will cause the switch 103 to disengage the input to the pitch autopilot integrator 100 so the integrator will retain its then-present output on the line 99. This acts as a memory of the trim point as it existed prior to the pilot override. As the pilot is overriding the autopilot system, the airspeed error limiter 73 causes the autopilot system only to respond to a 5 knot (or other suitable value) of the airspeed error which results. Therefore, when the pilot completes the maneuver, the difference in filtered airspeed from desired airspeed may cause a large airspeed error, but the autopilot system, including the pitch autopilot integrator, will be provided only relatively small airspeed errors while the pitch autopilot integrator itself will be providing an input that changes only slowly to these airspeed errors, and has an initial value equivalent to the previous desired airspeed which existed prior to pilot override.

As described hereinbefore with respect to FIG. 2, the present invention may preferably be implemented in a digital computer rather than with analog circuits of the type illustrated in FIGS. 1, 3 and 4.

Figure 5:
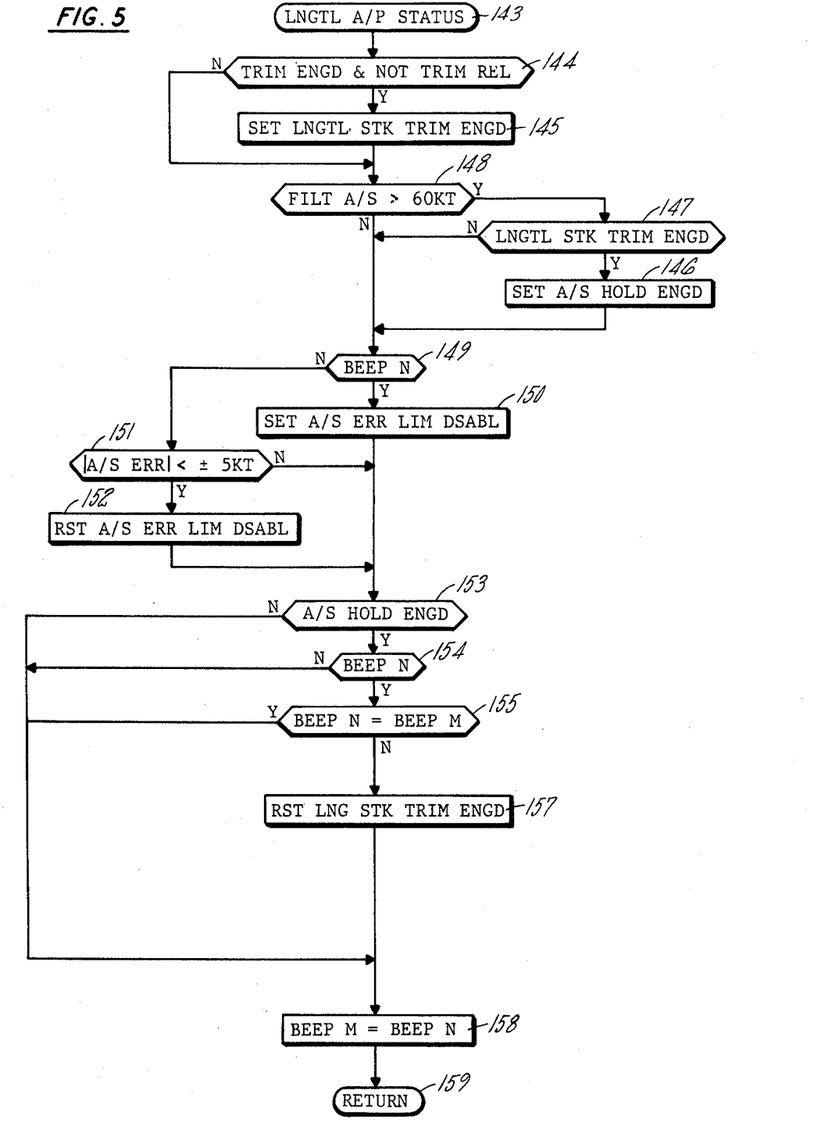
FIG. 5 is a simplified logic flow chart of a computer program routine for providing status indications useful in a digital embodiment of the present invention.

Referring now to FIG. 5, a subroutine for establishing status words for controlling the longitudinal autopilot is entered through a transfer point 143 and a first test 144 examines the status of a control panel trim engage switch as well as the trim release button on the stick. If the trim engage switch is closed and trim release has not been pressed, an affirmative result of test 144 will cause step 145 to set a longitudinal stick trim engaged flag. Otherwise, step 145 is bypassed. In this embodiment, the absence of longitudinal stick trim engaged is used as the equivalent of the pitch synch signal on the line 53 (along with the airspeed synch signal on line 55) to provide resetting and synchronizing functions, as described more fully with respect to FIG. 6 hereinafter. The distinction of being above cruise speeds or at subcruise speeds is noted by setting an airspeed hold engaged flag in a step 146 whenever a test 147 indicates that longitudinal stick trim is engaged and a test 148 indicates that filtered airspeed exceeds 60 knots. If a test 149 determines that the beeper switch is depressed during a current cycle, an airspeed error limit disable flag is set in a step 150. Once this flag is set in step 150 it can only be reset after beeping has been concluded, as indicated by a negative result of step 149, and the airspeed error is less than 5 knots as indicated by a test 151, which leads to a step 152 for resetting the airspeed error limit disable flag.

If airspeed hold is engaged (meaning that the longitudinal stick trim is engaged and the aircraft is flying faster than 60 knots), a test 153 will be affirmative leading to a test 154 which determines if the beeper is engaged in the current cycle. If so, a test 155 will determine if the beeper was engaged in the previous cycle by comparing a current cycle beep flag (beep N) with a previous cycle beep flag (beep M). If test 155 is negative, this means that beeping has been initiated within the present cycle, and a step 157 resets the longitudinal stick trim engaged flag (equivalent to generating the pitch synch signal as a result of beeping as described with respect to FIG. 3 hereinbefore).

Although not illustrated herein for simplicity, it is assumed, in the present digital embodiment, that certain of the status flags are reset at the start of each major computer cycle, and are selectively set, appropriately, as the program proceeds to reflect conditions existing within that cycle, in a well known manner. In this embodiment, it is assumed that prior to reaching the routine of FIG. 5, the longitudinal stick trim engaged flag, airspeed hold engaged flag, and certain of the calculated values that are used as intermediaries are reset, such that if they are not calculated or set, due to the particular related current status, they will be left in a zero state which is appropriate, as described more fully hereinafter.

With the foregoing in mind, in a subsequent pass of the program through the routine of FIG. 5, assuming appropriate conditions still exist, step 145 will set longitudinal stick trim engaged and step 146 will set airspeed hold engaged. Thus, test 153 will be affirmative and if the beep is continuously depressed, test 154 will be affirmative. However, since this is the second cycle in a row with the beep engaged, the beep status of this cycle equals the beep status of the preceding cycle so test 155 is affirmative and step 157 is bypassed. Once the test of step 155 is made, in every cycle, the current cycle beep status is updated for the next cycle in a step 158. In the present embodiment, once the longitudinal autopilot status subroutine of FIG. 5 is completed, other parts of the program are returned to through a return point 159. However, depending upon the particular embodiment, the subroutine of FIG. 6 could be entered directly following the subroutine of FIG. 5, if desired.

Figure 6:
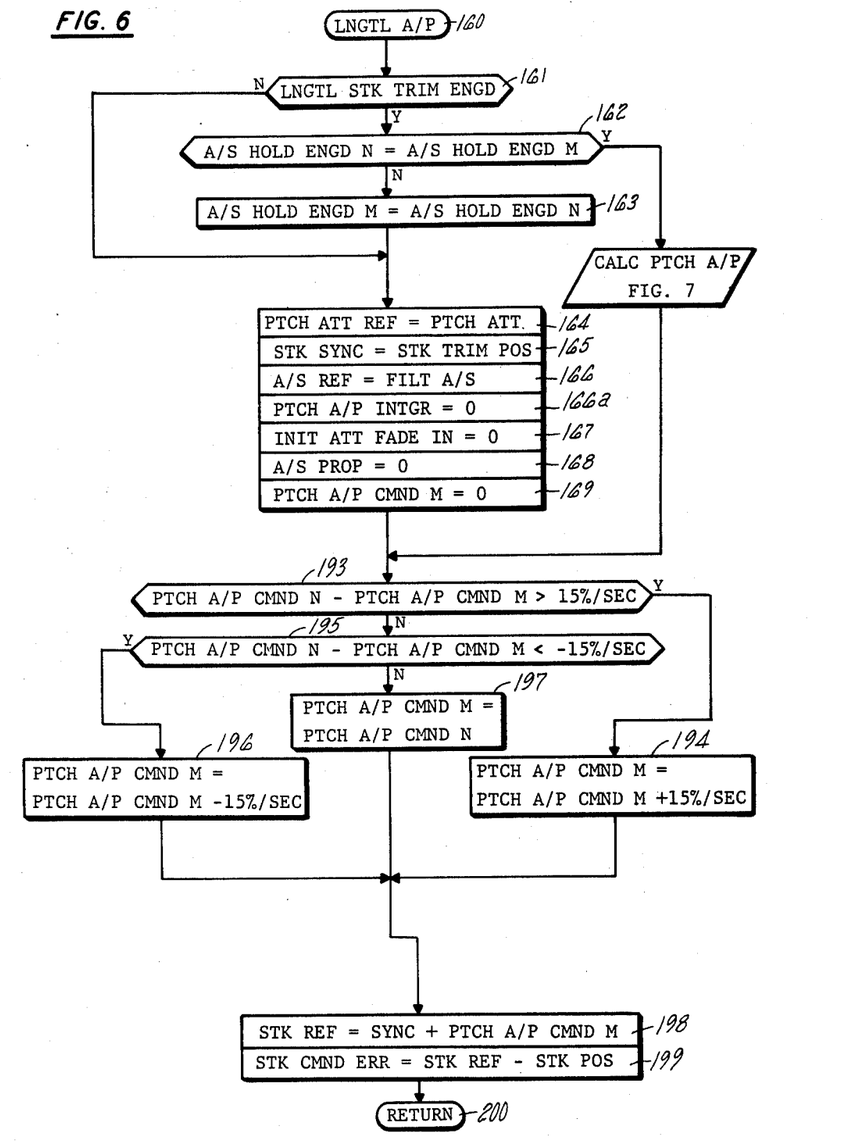
FIG. 6 is a simplified logic flow chart of digital computer routines for providing resynchronization, pitch autopilot command limitation and stick control functions in a digital computer embodiment of the invention.

Referring now to FIG. 6, a general longitudinal autopilot program, utilizing some of the status conditions established in FIG. 5, is reached through an entry point 160. A first test 161 determines if longitudinal stick trim is engaged. If it is, then a test 162 determines if the airspeed hold status has changed in this cycle from its status in the last cycle. This is equivalent to the circuitry 36-39 in FIG. 3 which generates the pitch synch signal and related signals whenever there is a transition from cruise speeds to sub-cruise speeds or vice versa. If there has not been a transition, test 162 will be affirmative, and autopilot pitch calculations will be made as described hereinafter with respect to FIG. 7. But if there has been a transition of airspeed, test 162 will be negative and the airspeed hold engaged status flag for the current cycle is updated to represent the previous cycle subsequently by a step 163.

In any case where there is a speed transition or where longitudinal stick trim is not engaged, a plurality of steps are performed, roughly equivalent to those performed by the pitch synch signal in FIG. 4. First, a step 164 causes the pitch attitude reference to equal the pitch attitude, equivalent to the synchronizing function achieved by the switch 86 and the integrating amplifier 84 of FIG. 4. Then a step 165 causes the stick synch value to be made equal to the stick trim position value, which is equivalent to the operation of the track store 131 in FIG. 4. Then a step 166 causes the airspeed reference value to be equal to filtered airspeed, which is equivalent to the synchronizing effected by the switch 72 and the integrating amplifier 70 in FIG. 4. A step 166a resets the pitch autopilot integrator value to zero. A step 167 causes the pitch rate fade-in factor to be initially set to zero; this may be used in parts of a program not described herein but similar to that described with respect to FIG. 21 of the aforementioned copending application, such that whenever it is set to zero it thereafter is incremented at a certain rate until it reaches a limit, and is available as a fade-in multiplication factor for use in the same fashion as described with respect to the fade-in circuit 94 of FIG. 4, as described in the digital version more particularly hereinafter. A step 168 sets the airspeed proportional signal to zero, which occurs in FIG. 4 as a consequence of the airspeed error going to zero, and step 169 causes the pitch autopilot command of the current cycle to be set to zero, which is equivalent to the summing junction 96 output being zero as a consequence of all zero inputs, in FIG. 4.

Figure 7:
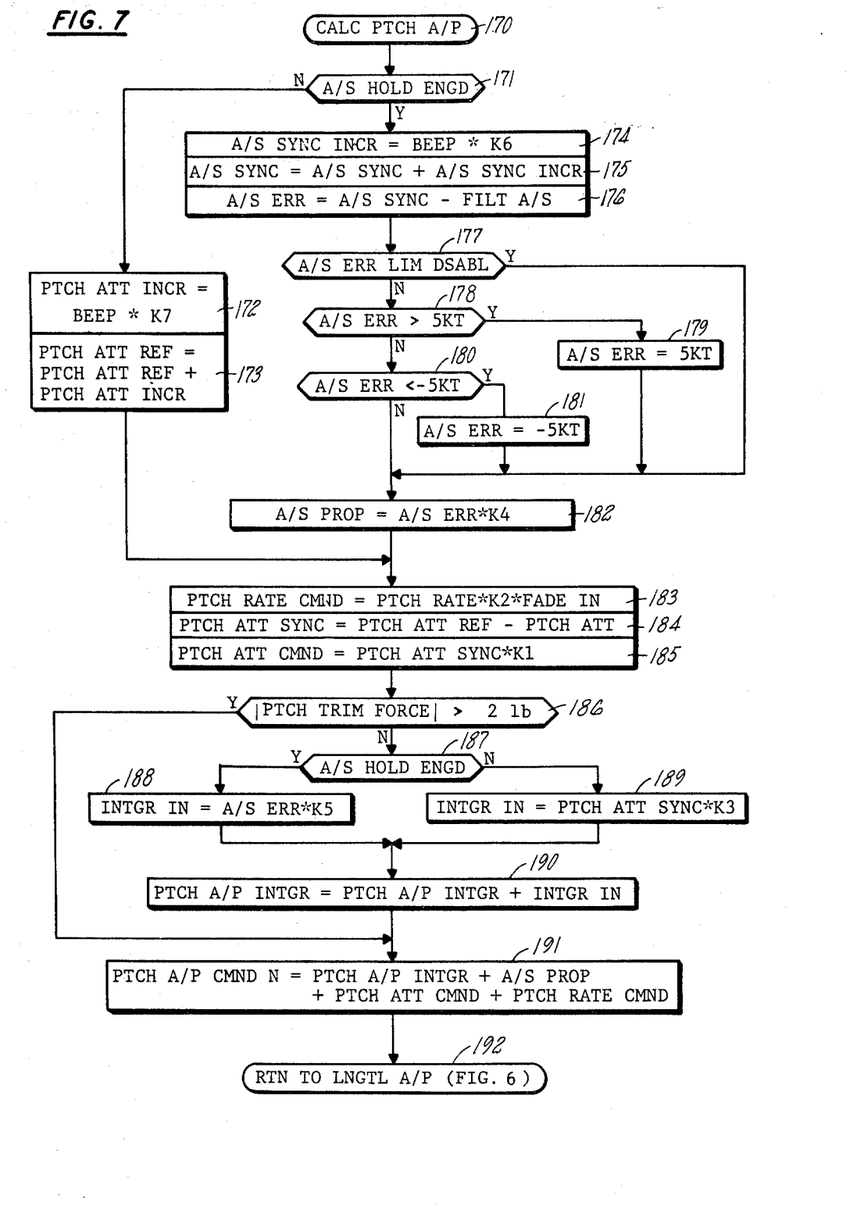
FIG. 7 is a simplified logic flow chart of a digital computer routine for calculating digital autopilot commands in a digital computer embodiment of the invention.

In the case where resynchronizing is not to occur because longitudinal stick trim is engaged and there has been no airspeed transition, as determined by tests 161 and 162, the calculate pitch autopilot routine of FIG. 7 is reached through an entry point 170. In FIG. 7, a first step 171 determines if airspeed hold is engaged. If not, this is equivalent to airspeed being below 60 knots in the embodiment of FIGS. 3 and 4. This means that the longitudinal or pitch autopilot system is being used for attitude hold. In such case, a negative result of test 171 will lead to a step 172 that generates a pitch attitude increment as the product of a beep fixed value (equivalent to the fixed voltage of the ±beep on the line 47 in the embodiments of FIGS. 3 and 4) times some factor indicative of the number of degrees per second that the beeper should nudge the trim point, which is equivalent to K7 in the integrating amplifier 84. The integration is performed as an accumulation in step 173 where pitch attitude reference has the pitch attitude increment added to it. If beeping is not in progress, the ±beep value will be zero, and the pitch attitude increment will be zero; the pitch attitude reference will thus remain equal to the pitch attitude, to which it was synchronized in step 164, FIG. 6.

If step 171 indicates airspeed hold is engaged, then factors relating to airspeed are calculated instead of attitude factors. A step 174 will calculate an airspeed reference increment as the product of the fixed beep signal (which may be zero), times a factor indicative of the number of knots per second that beeping should nudge the speed trim point, equivalent to K6 of the integrating amplifier 70 in the embodiment of FIG. 4. Then the integration is performed in a step 175 where the airspeed reference has added to it the airspeed reference increment. These steps are analogous to those performed in steps 172 and 173. Then airspeed error is determined as the difference between airspeed reference and filtered airspeed in a step 176. This is equivalent to the function of the summing junction 68 in the embodiment of FIG. 4. Then a test 177 determines if the airspeed error limiting is disabled or not. this is testing the status flag established in step 150 as described with respect to FIG. 5 hereinbefore, and is equivalent to the function of the switch 76 in the embodiment of FIG. 4. If test 177 is affirmative, the limiting functions are bypassed. But if test 177 is negative, then limiting has not been disabled so a test 178 determines if the airspeed error is greater than plus 5 knots, and if it is, a step 179 will set the airspeed error to be equal to the limiting value of 5 knots. If test 178 is negative, then a test 180 will determine if the airspeed error is more negative than minus 5 knots. If it is, a step 181 will set the airspeed error to the limiting value of minus 5 knots. In any event, whether limiting is performed or not, a step 182 is reached where the value of the airspeed proportional signal (equivalent to that on the line 98 in the embodiment of FIG. 4) is generated as the function of airspeed error times a gain constant equivalent to K4 in the amplifier 74 of the embodiment of FIG. 4.

Regardless of whether airspeed hold is engaged or not after calculation of suitable attitude or airspeed factors, the calculation of pitch autopilot values continues with a step 183 in which a pitch rate command factor, equivalent to the signal on the line 95 in the embodiment of FIG. 4, is generated as a function of the pitch rate signal (such as that on line 92) times a gain factor K2 (equivalent to amplifier 93) times the fade-in factor which was described with respect to step 167 in FIG. 6 hereinbefore. this is equivalent to the combined operation of the amplifier 93 and the fade-in circuit 94 in the embodiment of FIG. 4.

In FIG. 7, the next step 184 generates pitch attitude synch as a function of the pitch attitude reference minus the pitch attitude, which is equivalent to the function of the summing junction 81 in the embodiment of FIG. 4. And then a step 185 generates the pitch attitude command as the product of pitch attitude synch times a gain factor K1, equivalent to the function of the amplifier 90, FIG. 4. The steps 183-185 are provided whether airspeed hold is engaged or not since these functions are utilized both at cruise speeds and at sub-cruise speeds to provide attitude stability. On the other hand, the airspeed factors are only used at cruise speeds (equivalent to the constantly applied airspeed synch signal on the line 55 that prohibits generating any airspeed errors when flying at sub-cruise speeds).

In FIG. 7, the possibility of pilot override is then determined in a test 186. If the absolute value of pitch trim force is determined to be greater than 2 lbs. (which may be accomplished in sequence as described with respect to tests and steps 178-181, hereinbefore), the function of holding the value of the pitch autopilot integrator as at its then-current value when pilot override occurs is achieved by bypassing a plurality of integrating steps. But if the pilot is not overriding the autopilot system, a negative result of test 186 will cause a test 187 to determine whether airspeed hold is engaged (above 60 knots). If it is, the integrator input is determined to be airspeed error times a gain factor K5, which is the equivalent to the functions of the amplifier 75 and closure of the switch 107 in the embodiment of FIG. 4. But if airspeed hold is not engaged, a negative result of test 187 will lead to a step 189 wherein the integrator input is determined to be the product of pitch attitude synch times a gain factor K3, which is equivalent to the functions of the amplifier 91 and the switch 108 in the embodiment of FIG. 4. Then the integration function of the pitch autopilot integrator is performed in step 190 wherein the integrator input is added to the value of the pitch autopilot integrator which has previously been established. This is of course equivalent to the function of the integrator 100 in the embodiment of FIG. 4.

The final autopilot calculation in FIG. 7 is generating the pitch autopilot command for the current cycle (PTCH A/P CMND N) as the summation of the output of the pitch autopilot integrator, the airspeed proportional value, the pitch attitude command and the pitch rate command. This is the same as the summation function performed by the summing junction 96 in the embodiment of FIG. 4.

When the pitch autopilot calculations of FIG. 7 are complete, the program returns to the general longitudinal autopilot program of FIG. 6 through a transfer point that leads to a test 193 in FIG. 6. This determines whether the pitch autopilot command for the present cycle (N) exceeds the pitch autopilot command for the next preceding cycle (M) by more than 15% of authority per second. If it does, a step 194 will generate an updated pitch autopilot command (M) as the value of the pitch autopilot command in the previous cycle (M) plus a value equivalent to 15% of authority per second. But if the present command does not exceed the previous command by a positive 15% per second, a negative result of test 193 will cause a test 195 to determine if the pitch autopilot command of the present cycle (N) is more negative than the pitch autopilot command of the preceding cycle (M) by more than minus 15% of authority per second. If it is, the updated pitch autopilot command (M) is generated as the pitch autopilot command of the previous cycle (M) minus 15% of authority per second in a step 196. But if the commands are within 15% of each other, both tests 193 and 195 will be negative so that the updated pitch autopilot command (M) for use in the next cycle is set equal to that (N) for the present cycle in a step 197. The effect of steps 194, 196 and 197 is both to limit the change in the pitch autopilor command from one cycle to the next, and to update the value to be used in the next cycle for comparison with the value generated in the next cycle. All of the tests and steps 193-197 are simply equivalent to the rate limiter 111 in the embodiment of FIG. 4. Notice that there is no need to bypass this function during synchronizing as a consequence of longitudinal stick trim being disengaged (equivalent to the pitch synch signal on the line 53 in FIG. 4 and the function of the switch 112 therein), because the updated pitch autopilot command (M) is the value of interest and it is directly set to zero in step 169 during resynchronization.

In FIG. 6, the stick reference value is generated as the summation of the stick synch value and the pitch autopilot command, in a setp 198 which is equivalent to the summing junction 114 in the embodiment of FIG. 4. Then a step 199 generates a stick command error value as the difference between the stick reference value and the stick trim position, which is equivalent to the function of the summing junction 117 in the embodiment of FIG. 4. This completes the autopilot routines so that other portions of the program can be returned to through a return point 200.

In the dual computer, helicopter control system of the type illustrated in our aforementioned copending application, the autopilot functions are performed only if both computers are not disabled. This is because failure of full-authority autopilot functions of either computer could cause an immediate hard-over situation that is potentially disastrous. Therefore, the autopilot functions described herein are performed only during duplex operation, and not simplex operation. For instance, the longitudinal autopilot status subroutine of FIG. 5 may be performed in the duplex operation status routine 1203 illustrated in FIG. 12 of said copending application, provided test 1202 therein determines that the particular computer is not in simplex operation. Similarly, the tests and synchronizing aspects of that portion of the longitudinal autopilot subroutine shown in the upper half of FIG. 6 herein as well as the calculate pitch autopilot subroutine illustrated in FIG. 7 herein may be performed in the pitch outer loop calculation routine 1403 illustrated in FIG. 14 of said copending application provided a test 1402 therein determines that the particular computer is not operating in simplex mode. And the portion of the longitudinal autopilot subroutine illustrated at the bottom of FIG. 6 herein which limits the pitch autopilot command and calculates the stick command error, may be performed in the pitch force augmentation calculation-A subroutine 519 illustrated in FIG. 5 of our copending application, the results of which may be outputted to the trim actuator in the pitch force augmentation output-A subroutine 703 in FIG. 7 of said application, provided tests 518 in FIG. 5 and 702 in FIG. 7 indicate that the particular computer is not operating alone in simplex mode, and these calculations may be repeated a second time in each major run through the computer program, such as in the pitch force augmentation calculation-B routine 904 in FIG. 9 of said application, the results of which may be applied to the trim actuator in the pitch force augmentation output-B routine 1003 in FIG. 10 of said application, provided tests 902 in FIG. 9 and 1002 in FIG. 10 indicate that the related computer is not operating alone in a simplex mode. This dual calculation and output simply provides a greater frequency of updating of stick command errors to the trim actuator, in contrast with the basic computer cycle (macro synch, in said copending application).

On the other hand, digital embodiments as illustrated in FIGS. 2 and 5-7 may be implemented in other than dual-computer systems wherever suitable provision is made so that failure of such a system need not be deemed catastrophic. And, as described briefly hereinbefore, the autopilot functions of the present invention may be, and indeed have been, implemented in systems in which the autopilot control over stick position is provided by a trim actuator that does not include any force inputs. In the embodiments disclosed herein, the force calculations, such as those that provide force as a function of acceleration, of the type illustrated in an analog fashion in U.S. Pat. No. 4,078,749 have been eliminated herefrom for simplicity since they are not relevant to the present invention, and may be implemented in an analog fashion or in any suitable digital fashion obvious from the disclosure in U.S. Pat. No. 4,078,749, in dependence upon the particular system in which the invention is practiced.

From the foregoing description, certain major aspects and consequent advantages of the invention should be noted. For instance, the trim release of the present invention not only synchronizes the stick command error (at the input to the trim actuator) to the stick trim position, but also continuously synchronizes the pitch attitude reference and the airspeed reference, as well as resetting the pitch autopilot integrator. Further, transitions between speeds do not create transient disturbances because these transitions also trim the stick, the airspeed reference, the pitch attitude reference and the pitch autopilot integrator. And the initiation of beeping also trims the airspeed and attitude references, the pitch autopilot integrator, and the stick; but, this resynchronizing is only momentary, after which continuation of beeping will nudge the airspeed or attitude reference depending upon whether the aircraft is at cruise speeds or not, respectively. An important aspect of the invention is that utilization of a heavily filtered Pitot static airspeed to provide drift correction for an integrated longitudinal acceleration airspeed eliminates indicated airspeed disturbances as a function of gusts and turbulence; this provides obvious and inherent improvement in the function of any airspeed-responsive apparatus; but, it is particularly significant in an airspeed hold autopilot system, since it allows utilization of maximum gain for tight control over airspeed, without creating uncomfortable perturbations in aircraft attitude as the result of erratic airspeed indications. Another aspect of the invention is that the pilot can override the autopilot system without disengaging it, and can thereafter return to essentially the previous reference airspeed or attitude, because the pitch autopilot integrator is put into a hold state during pilot override, and in the case of airspeed hold, the airspeed error input to the integrator is limited to avoid abrupt changes after pilot override has ended; this permits the pilot to easily maneuver the helicopter and then return to the previous airspeed or attitude being held by the autopilot.

The foregoing are the important aspects of the invention; other aspects of the embodiments in which the invention have been disclosed herein are not significant. That is to say, the choice of hardware or software implementations, the detailed nature of the hardware or of the architecture of a computer in which the software may be implemented, and the particular type of trim actuator system utilized are not significant to the invention.

Thus, although the invention has been shown and described with respect to exemplary embodiments thereof, it should be understood by those skilled in the art that the foregoing and various other changes, omissions and additions in the form and detail thereof may be made therein and thereto, without departing from the spirit and the scope of the invention.

We claim:

1. An airspeed hold autopilot system for a helicopter having a longitudinal cyclic pitch control stick with a trim release switch disposed thereon, comprising:

a trim actuator responsive to electrical signals applied thereto to position the longitudinal cyclic pitch control stick of the helicopter;

airspeed means for providing an airspeed signal indicative of actual helicopter airspeed;

trim means responsive to said trim release switch for providing a trim release signal;

position means responsive to said trim actuator for providing a stick trim position signal indicative of the longitudinal cyclic pitch stick trim position established by said trim actuator; and signal processing means, responsive to said airspeed signal, said trim release signal, and said stick trim position signal, for providing in response to the presence of said trim release signal, an airspeed reference signal equal to said airspeed signal, and a stick synch signal equal to said stick trim position signal, for providing an airspeed error signal as the difference between said airspeed reference signal and said airspeed signal, for providing in the absence of said trim release signal a pitch autopilot command signal as a function of said airspeed error signal, and for providing a stick reference signal as a function of the difference between said pitch autopilot command signal and said stick synch signal and a stick command error signal applied to said trim actuator as a function of the difference between said stick reference signal and said stick trim position signal, whereby said stick command error signal can be zero during said trim release signal when said pitch autopilot command signal is zero valued and said airspeed reference signal is set equal to said actual airspeed signal so that said airspeed error signal consequently is zero valued, while said stick trim position signal retains a finite value indicative of current stick trim position.

2. An airspeed hold autopilot system according to claim 1 further comprising:
   attitude means for providing an attitude signal indicative of actual aircraft pitch axis attitude; and
   wherein said signal processing means is responsive to said attitude signal for providing in response to the presence of said trim release signal an attitude reference signal equal to said attitude signal, for providing an attitude error signal as the difference between said attitude reference signal and said attitude signal, for providing in the absence of said trim release signal said pitch autopilot command signal as a function of said airspeed signal whenever the airspeed indicated by said airspeed signal is in excess of a predetermined threshold cruise speed, or as a function of said attitude error signal whenever the airspeed indicated by said airspeed signal is less than said predetermined threshold cruise speed, whereby said stick command error signal can be zero during said trim release signal when said pitch autopilot command signal is zero valued, said airspeed reference signal is set equal to said actual airspeed signal so that said airspeed error signal consequently is zero valued and said attitude reference signal is set to said attitude signal so that said attitude error signal consequently is zero valued, while said stick trim position signal retains a finite value indicative of current stick trim position.

3. A pitch axis autopilot system for a helicopter having a longitudinal cyclic pitch control stick, comprising:
   a trim actuator responsive to electrical signals applied thereto to position the longitudinal cyclic pitch control stick of the helicopter;
   attitude means for providing an attitude signal indicative of actual aircraft pitch axis attitude;
   airspeed means for providing an airspeed signal indicative of actual helicopter airspeed;
   position means responsive to said trim actuator for providing a stick trim position signal indicative of the longitudinal cyclic pitch stick trim position established by said trim actuator; and
   signal processing means, responsive to said airspeed signal, said attitude signal, and said stick trim position signal, for providing in response to said airspeed signal, a cruise speed transition signal whenever the airspeed indicated by said airspeed signal transitions from a predetermined threshold cruise speed to a sub-cruise speed or vice versa, for providing in response to the presence of said cruise speed transition signal, an airspeed reference signal equal to said airspeed signal, an attitude reference signal equal to said attitude signal, and a stick synch signal equal to said stick trim position signal, for providing an airspeed error signal as the difference between said airspeed reference signal and said airspeed signal, an attitude error signal as the difference between said attitude reference signal and said attitude signal, for providing in the absence of said cruise speed transition signal a pitch autopilot command signal as a function of said airspeed error signal if said airspeed signal indicates a cruise speed or as a function of said attitude error signal if said airspeed signal indicates a sub-cruise speed, and for providing a stick reference signal as a function of the difference between said pitch autopilot command signal and said stick synch signal and a stick command error signal applied to said trim actuator as a function of the difference between said stick reference signal and said stick trim position signal, whereby said stick command error signal can be zero during said cruise transition signal when said pitch autopilot command signal is zero valued, said airspeed reference signal is set equal to said airspeed signal so that said airspeed error signal consequently is zero valued and said attitude reference signal is set equal to said attitude signal so that said attitude error signal consequently is zero valued, while said stick trim position signal retains a finite value indicative of current stick trim position, whereby transient attitude disturbances, resulting from transitions between cruise and sub-cruise speeds with the pitch axis autopilot engaged, are mitigated.

4. An airspeed hold autopilot system for a helicopter having a longitudinal cyclic pitch control stick with a forward beeper switch and an aft beeper switch disposed thereon, comprising:
   a trim actuator responsive to electrical signals applied thereto to position the longitudinal pitch control stick of the helicopter;
   airspeed means for providing an airspeed signal indicative of actual helicopter airspeed;
   attitude means for providing an attitude signal indicative of actual helicopter attitude;
   beeper means responsive to said beeper switches for providing in response to operation of either of said beeper switches a ±beep signal, the polarity of which depends on which of said beeper switches is operated;
   position means responsive to said trim actuator for providing a stick trim position signal indicative of the longitudinal cyclic pitch stick trim position established by said trim actuator; and
   signal processing means, responsive to said airspeed signal, said attitude signal, said ±beep signal, and said stick trim position signal, for providing in response to initial presence of said ±beep signal, an airspeed reference signal equal to said airspeed signal, an attitude reference signal equal to said attitude signal, and a stick synch signal equal to said stick trim position signal, for thereafter providing in the presence of said ±beep signal said airspeed reference signal as a function of said ±beep signal if said airspeed signal indicates a cruise speed or said attitude reference signal as a function of said ±beep signal if said airspeed signal indicates a sub-cruise speed, and for providing an airspeed error signal as the difference between said airspeed reference signal and said airspeed signal, an attitude error signal as the difference between said attitude reference signal and said attitude signal, a pitch autopilot command signal as a function of said airspeed error signal if said airspeed signal indicates a cruise speed or as a function of said attitude error signal if said airspeed signal indicates a sub-cruise speed, a stick reference signal as a function of the difference between said pitch autopilot command signal and said stick synch signal, and a stick command error signal applied to said trim actuator as a function of the difference between said stick reference signal and said stick trim position signal, whereby said stick command error signal can be zero during initial presence of said ±beep signal when said pitch autopilot command signal is zero valued, said airspeed reference signal is set equal to said airspeed signal so that said airspeed error signal consequently is zero valued and said attitude reference signal is set equal to said attitude signal so that said attitude error signal consequently is zero valued, while said stick trim position signal retains a finite value indicative of current stick trim position, whereby transient attitude disturbances, resulting from beeping of the pitch axis autopilot trim point, are mitigated.

5. A pitch axis autopilot system for a helicopter, comprising:

pitch control means including a longitudinal cyclic pitch control stick and a trim actuator responsive to electrical signals applied thereto to position said control stick to a stick trim position;

airspeed means for providing an airspeed signal indicative of actual helicopter airspeed;

override means responsive to said pitch control means for providing an override signal indicative of said control stick being moved a threshold amount away from said stick trim position; and signal processing means, responsive to said airspeed signal for providing an airspeed reference signal indicative of an airspeed which said autopilot is to hold and an airspeed error signal as the difference between said airspeed reference signal and said airspeed signal, for providing in the absence of said override signal a pitch autopilot integrator signal as a function of the time integral of said airspeed error signal if the magnitude of said airspeed error signal exceeds a predetermined airspeed error limit magnitude or as a function of the time integral of said airspeed limit magnitude if the magnitude of said airspeed error signal is less than said limit magnitude, for providing in the presence of said override signal said pitch autopilot integral signal equal to the pitch autopilot integral signal which existed at the moment said override signal appears, and for providing a stick command signal for application to said trim actuator as a function of said pitch autopilot integral signal.

6. A pitch axis autopilot system according to claim 5 further comprising:

attitude means for providing an attitude signal indicative of actual aircraft pitch axis attitude; and wherein said signal processing means is responsive to said attitude signal for providing an attitude reference signal indicative of an attitude which said autopilot is to hold and an attitude error signal as the difference between said attitude reference signal and said attitude signal, for providing in the absence of said override signal, whenever said airspeed signal indicates an airspeed in excess of a predetermined threshold cruise speed, said autopilot integrator signal as a function of said airspeed error signal or said airspeed limit magnitude, or whenever said airspeed signal indicates an airspeed less than said predetermined threshold cruise speed, said pitch autopilot integrator signal as a function of the time integral of said attitude error signal.

7. Apparatus for providing an aircraft airspeed signal comprising:

a Pitot static airspeed sensor for providing a raw airspeed signal indicative of the Pitot static indication of the airspeed of the aircraft;

a longitudinal accelerometer for providing a longitudinal acceleration signal indicative of the acceleration of the aircraft along its longitudinal axis; and signal processing means for providing an integrated, filtered airspeed signal, for providing an airspeed difference signal as the difference between said raw airspeed signal and said filtered airspeed signal, for providing a proportional airspeed difference signal as a proportional function of said airspeed difference signal, for providing an integral airspeed difference signal as an integral function of said airspeed difference signal, for providing an aircraft acceleration signal as the summation of said proportional airspeed difference signal, said integral airspeed difference signal, and said longitudinal acceleration signal, and for providing said integrated, filtered airspeed signal as the integral of said acceleration signal.

* * * * *